UNITED STATES PATENT OFFICE.

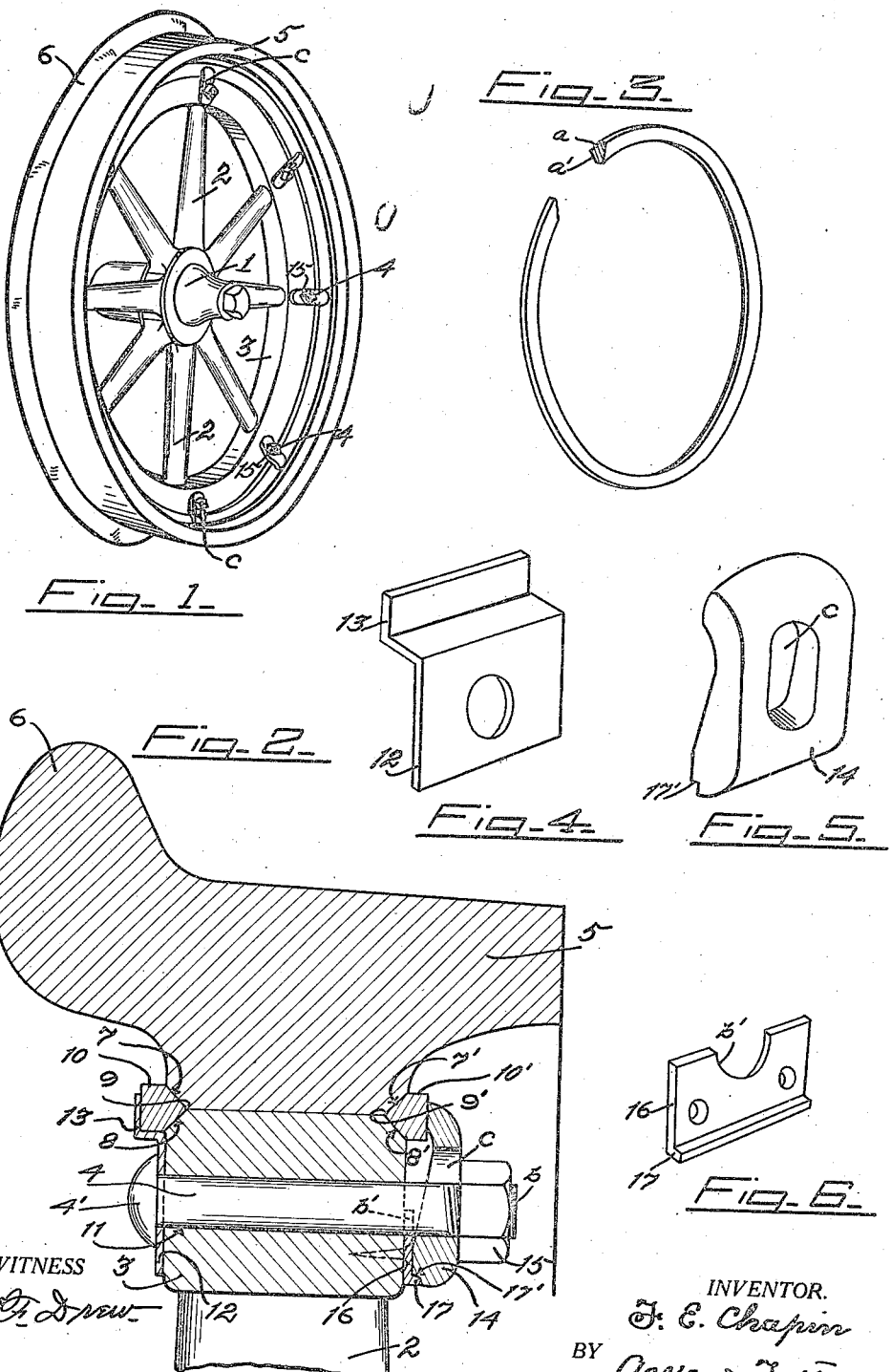

FRANK E. CHAPIN, OF SAN JOSE, CALIFORNIA.

WHEEL FOR RAILWAY-AUTOMOBILES.

1,209,394.  Specification of Letters Patent. Patented Dec. 19, 1916.

Application filed July 17, 1916. Serial No. 109,640.

*To all whom it may concern:*

Be it known that I, FRANK E. CHAPIN, a citizen of the United States, residing at San Jose, in the county of Santa Clara and State of California, have invented certain new and useful Improvements in Wheels for Railway-Automobiles, of which the following is a specification.

The hereinafter described invention relates to an improved wheel construction for application to automobiles for enabling said vehicles to be operated on railways generally, and by means of which an ordinarily constructed automobile may be utilized for use on railways, thereby enabling said type of vehicles to take the place of the heavy and expensive form of cars at present employed in connection with the operation of electric and street railways, and by so doing enabling established railway operating lines to successively compete with the so-called "jitneys," which at the present time enter into active competition with the passenger carrying railways.

By providing for the use of automobiles in connection with the railways as at present established, the heavy expense incident to the running of electrically operated vehicles and propelled passenger carrying vehicles is dispensed with and the railway is thereby enabled to successfully compete with the jitneys or light road traveling vehicles which at the present time enter into active competition with the street and electric railways, and due to the fact that the "auto" cars of the railway will run on fixed trackways, they may be operated at a much less expense than the "jitney" cars which are required to operate on the roadways.

The object of the invention is to enable the wheel of an ordinary automobile to be quickly converted or adapted for travel on rails, which object is attained by providing a flanged metallic tread capable of being demountably connected or attached to the wheels of the automobile.

To comprehend the invention, reference should be had to the accompanying sheet of drawings, wherein—

Figure 1 is a perspective view of a wheel with the metallic flanged tread applied thereto. Fig. 2 is a vertical sectional view of the wheel. Fig. 3 is a detail view of one of the clamping and centering rings employed for securing the rim to the wheel. Fig. 4 is a perspective view of one of the clamp plates for the inner stationary clamping ring. Fig. 5 is a similar view of one of the clamp lugs for the removable or outer clamping ring. Fig. 6 is a detail view of one of the supporting plates for the outer clamping ring.

In the drawings, the numeral 1 is used to designate the hub of an ordinary automobile wheel, 2 the radial spokes thereof, and 3 the usual wooden felly, provided with transverse bores for the reception of the rim securing bolts 4. The metallic rim or tread is represented by the numeral 5, which is of a size to slip freely onto the felly 3, and the same is formed with an integral outstanding rail flange 6. The inner circumferential edges of the metallic tread or rim 5 are inwardly beveled, as indicated at 7 and 7', and the outer circumferential edges of the felly are similarly beveled, as indicated at 8 and 8'. These bevels or inclines when the metallic rim or tread 5 is fitted onto the felly 3 provide inclined annular channels or seats 9—9' for the reception of the metallic centering and securing rings 10—10', each of which is provided with the double inclined surfaces $a$—$a'$ which bear against the inclined faces 7—7' and 8—8' respectively of the rim and felly when the said rings are seated within the annular channels, grooves or seats 10—10', and serve when forced inwardly to center the metallic ring 5 relative to the wooden felly 3 of the wheel.

As stated, the felly 3 of the wheel is provided circumferentially with a series of transverse bores 11 for the reception of the securing bolts 4, the head 4' of each bolt holding to the inner face of the felly a clamp plate 12. Each of said plates is provided with a shouldered flange section 13, for the support of the centering ring 10 and the holding of the same in adjusted position. The opposite or companion centering ring 10' is held in position by means of the vertically slotted clamp lugs 14, through the slotted portion of which extends the screw threaded end $b$ of the bolt 4. The nut 15 screwed onto the end $b$ bears against the outer face of the clamp lug 14 and holds the same firmly against the centering and securing ring 10' and the supporting plate 16. The said plate 16 is screwed to the outer face of the felly 3 and its upper end portion is cut away at $b'$ to straddle the securing bolt 4, and at its lower end said plate is formed with an outstanding shoulder 17 on which rests and is supported the shoulder 17' of the clamp lug 14.

Fig. 1 of the drawings illustrates the metallic flanged rim or tread secured or attached to the felly of an ordinary automobile wheel, the said tread taking the place of the usual pneumatic rim. To remove the said metallic flanged rim or tread 5, it is only required to unscrew or loosen the nuts 15 of the securing bolts 4, to permit the clamp lugs to be moved outwardly until the shoulder 17' clears the shoulder 17 of the supporting plate 16, when the said clamp lug is permitted to drop downwardly the distance of the vertical slot $c$ therein. When thus lowered the said clamp lug is supported on the securing bolt 4 and when each clamp lug has been thus released, the centering ring 10' is free to be removed and the metallic flanged rim 5 slipped from the felly 3.

In order to adapt an ordinary automobile for use on the track rails of an established street or electric railway, it is only required to remove from the wheels thereof the outer tires, metallic rim and the attaching means therefor. The flanged metallic rim 5 is then slipped onto the wooden felly of the wheel, the centering rings 10 and 10', clamp plates 12 and clamp lugs 14 properly positioned, and the nuts 15 tightened onto the bolts 4, to draw the centering rings securely against the inclined faces of the flanged metallic rim and the felly 3 of the wheel.

I am aware that metallic flanged wheels have been applied to automobiles for the purpose of allowing the same to be used on rails, but in such case a metallic constructed car wheel is substituted for the automobile wheel. In the present case, the wheels of the automobile are utilized and a flanged rail running rim demountably secured thereon, with the result that a change may be quickly made either to adapt the automobile for travel on the tracks of the railway or for travel on roadbeds.

Having thus described my invention, what I claim as new and desire to protect by Letters Patent is:—

The combination with an automobile wheel, of a flanged metallic rail running rim fitted to the felly thereof, centering rings adapted to engage the felly and rim at each side thereof, a series of supporting clamp plates for one of said rings, a series of slotted clamp lugs for the opposing ring, and means for securing said plates and lugs in clamped position relative to the said rings and the felly.

In testimony whereof I have signed my name to this specification in the presence of two subscribing witnesses.

FRANK E. CHAPIN.

Witnesses:
 FREDERICK GRIFFIN,
 WILLIAM F. JAMES.

Copies of this patent may be obtained for five cents each, by addressing the "Commissioner of Patents, Washington, D. C."